TUNNEL DIODE-HOT CARRIER DIODE MONOSTABLE CIRCUIT

Filed March 24, 1969

INVENTOR
OLAV PETERSON
BY Curphey + Erickson
PATENT AGENTS

United States Patent Office 3,562,655
Patented Feb. 9, 1971

3,562,655
TUNNEL DIODE-HOT CARRIER DIODE MONOSTABLE CIRCUIT

Olav Peterson, Ottawa, Ontario, Canada, assignor to Northern Electric Company Limited, Montreal, Quebec, Canada Filed Mar. 24, 1969, Ser. No. 809,634
Int. Cl. H03d 3/04; H03k 23/16
U.S. Cl. 329—126 2 Claims

ABSTRACT OF THE DISCLOSURE

A tunnel diode monostable circuit having improved trigger sensitivity which is achieved by biasing a non-linear load. The key element in the load is a hot carrier diode which is forward biased just below the knee of its characteristic when the circuit is in its quiescent state.

This invention relates to a tunnel diode monostable circuit and more particularly to such a circuit having high sensitivity which may be used in a counter-type demodulator for frequency or phase modulated signals.

In a counter-type demodulator, the incoming F-M signal is converted to a train of pulses of constant amplitude and width, in which the repetition rate is equal to, or proportional to the incoming frequency. If the shape of the pulses remains fixed and independent of the repetition rate, the average value of such pulses obtained through integration is proportional to the duty cycle and hence to the modulation frequency. Consequently, the modulation signal can be recovered through such integration without introducing distortion, if the generation of such pulses is flawless.

With wideband F-M systems, having a high modulation index, one of the major sources of distortion occurs in the demodulator. It is therefore apparent that a counter-type demodulator without any turned circuits provides an excellent form of demodulation. With present day technology, circuits can be readily constructed that will provide linear pulse-counter demodulation which operate at low carrier frequencies with narrow deviations and low modulating indexes. However, major difficulties have been encountered when attempting to construct a circuit that will function as a useful pulse-counter demodulator with a wideband, very high frequency carrier system (e.g., carrier frequency—70 mHz., peak frequency deviation—20 mHz., modulation index —2, amplitude linearity—less than 1%, and envelope delay distortion—½ ns.).

One known form of a circuit which may be used to produce such a train of pulses having a very short duration, is a tunnel diode monostable multivibrator such as described in U.S. Pat. No. 3,209,162, issued Sept. 28, 1965 to R. H. Bergman. In order to provide improved sensitivity and recovery time, the Bergman circuit utilizes a non-linear biasing scheme which includes an inductor connected in series with a tunnel rectifier across the tunnel diode. The rectifier, in turn, is reverse biased so that the combination reflects a high impedance across the tunnel diode when the latter is in its quiescent state.

The switching trajectory of a tunnel diode monostable multivibrator is a very sensitive function of the trigger signal. Therefore, such a circuit will not produce a constant width or amplitude pulse train unless the rise time of the leading edge and the energy of the trigger pulses remains constant regardless of the carrier frequency. Also, complete recovery of the circuit between each output pulse is necessary in order to insure an undistorted switching trajectory. This requirement is met by limiting the size of the inductor so that a 3 ns. pulse width is obtained. It is important, from the point of view of achieving a pulse shape which remains independent of the input frequency, to trigger the monostable circuit with a "spike" wherein the duration is much shorter than the cycle time and the amplitude remains fixed.

Such a trigger signal can be obtained at 70 mHz. from the differentiated output of a tunnel diode amplitude limiter circuit, such as described in U.S. Pat. No. 3,344,354, issued Sept. 26, 1967 to Edward Bellem. The above described limiter circuit provides excellent amplitude compression without introducing appreciable amounts of A-M to P-M conversion. Typical results of 36 db A-M compression with only 0.1°/db A-M/P-M conversion can be readily achieved with such a circuit using germanium tunnel diodes having a peak current of 2 ma. However, the amplitude of the signals available from this circuit are insufficient for triggering the above described monostable circuit in order to produce 3 ns. pulses at 70 mHz. Consequently, because of the limited signal amplitude available from suitable trigger sources and the limited trigger sensitivity of prior pulse generators, pulse-counter demodulators of the prior art have been limited to relatively low frequency applications.

It has been discovered that the sensitivity of the above described Bergman circuit can be improved by substituting a hot carrier diode (which has a sharp knee characteristic) for the tunnel rectifier described therein and by forward biasing (as opposed to reverse biasing) the diode a predetermined amount, so that the low level trigger signals from the differentiated output of the above-described Bellem circuit can be successfully utilized. A hot carrier diode is used because it has a sharp knee characteristic and no measurable storage delay.

Thus, the present invention provides an improved monostable multivibrator circuit which comprises a tunnel diode, having an inductance and a current source connected in series thereacross; and a hot carrier diode connected in series with a voltage source across the current source. In addition, the circuit includes an impedance means for connecting a signal voltage across the tunnel diode, and also means for connecting the resulting signal voltage from the tunnel diode. In the circuit of the present invention, the current and voltage sources coact to forward bias both the diodes so that in their quiescent state, the low voltage, high resistance region of the hot carrier diode intersects the low voltage positive resistance region of the tunnel diode just below the latter's peak current point, and so that in the transient state, resulting from the application of a signal voltage, the high voltage low resistance region of the hot carrier diode twice intersects the negative resistance region of the tunnel diode.

An example embodiment of the invention will now be described with reference to the accompanying drawings in which.

Figures 1, 2, 3, 4:
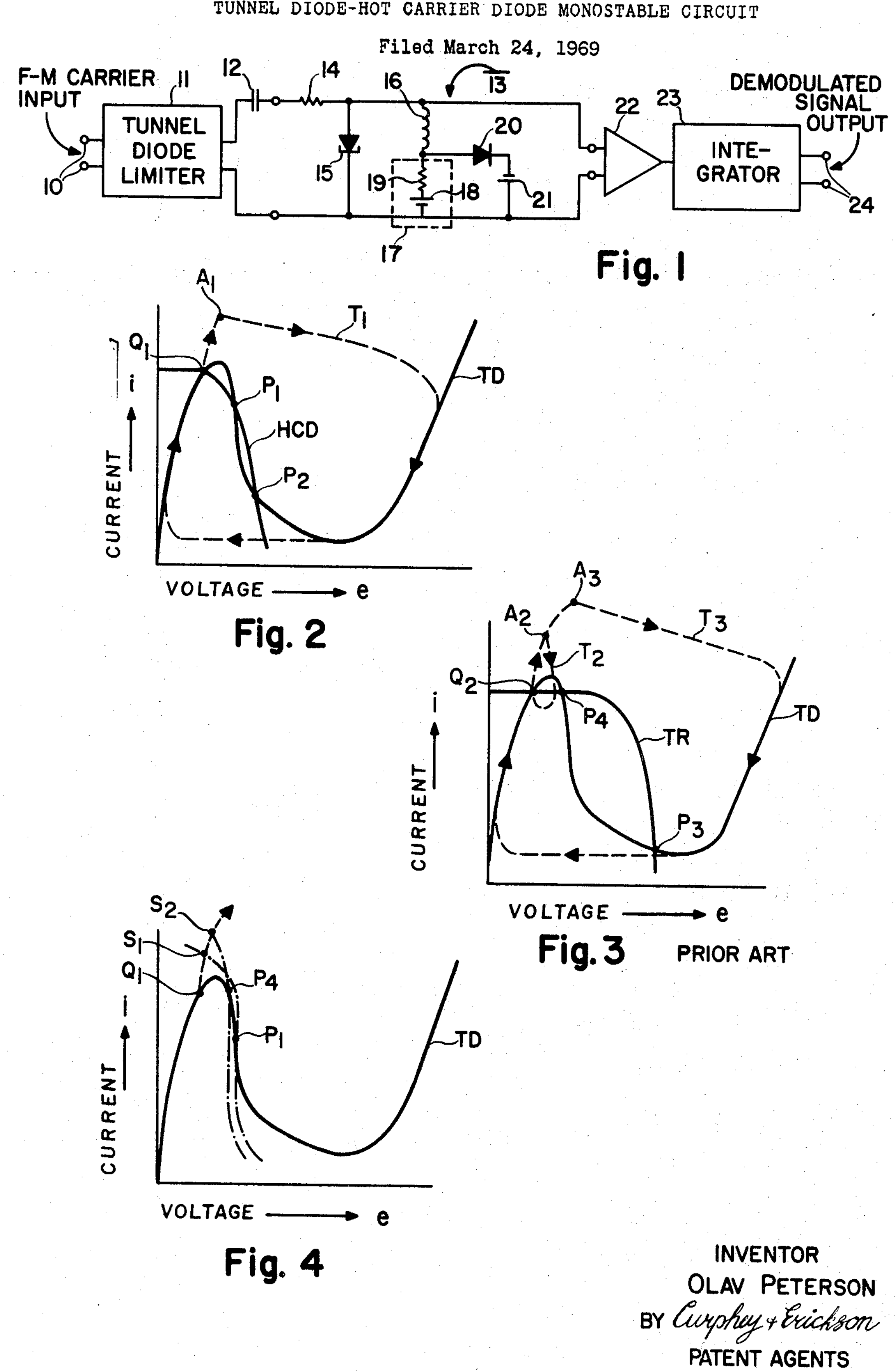
FIG. 1 illustrates a schematic and block circuit diagram of a F-M demodulator incorporating a tunnel diode monostable circuit in accordance with the present invention.
FIG. 2 is a graph illustrating the current versus voltage characteristics of various elements in the monostable circuit illustrated in FIG. 1.
FIG. 3 is a graph illustrating the current versus voltage characteristics of various elements in a tunnel diode monostable circuit of the prior art.
FIG. 4 is a graph illustrating the trigger sensitivity of the present invention as compared to that of the prior art.

Referring to FIG. 1, the demodulator comprises a pair of input terminals 10 connected to a tunnel diode amplitude limiter 11 which may be the same as that described in the above-mentioned patent to Bellem. The output of the tunnel diode limiter 11 is connected through a capacitor 12 to the input of a tunnel diode monostable circuit, generally 13.

The tunnel diode monostable circuit 13 comprises an impedance means, which in the present embodiment is a resistor 14 that connects the input of the monostable circuit 13 to a tunnel diode 15. In parallel with the tunnel diode 15 is an inductance 16 in series with a source of current, generally 17. The latter is derived from a source of voltage 18 in series with a relatively high impedance resistor 19. In parallel with the source of current 17 is a hot carrier diode 20 in series with a source of voltage 21. The output of the monostable circuit 13 which is derived across the tunnel diode 15, is connected to the input of an amplifier 22, the output of which is connected through a linear integrator 23 to the output terminals 24 of the demodulator. The impedance of the resistor 14 must be high enough so that the output impedance of the tunnel diode limiter 11 will not appreciably shunt the tunnel diode 15. However, the high impedance of the resistor 14 results in a decrease in the amplitude of the trigger pulse which is applied to the diode 15.

FIG. 2 illustrates the current versus voltage characteristics of the tunnel diode 15 on which is superimposed the non-linear load line of the hot carrier diode 20. As shown in this figure, the tunnel diode characteristic TD includes a negative resistance region interposed low and high voltage positive resistance regions, while the hot carrier diode characteristic HCD includes a low voltage high resistance region and a high voltage low resistance region intersecting at a relatively sharp knee. The tunnel diode 15 has a peak current $I_p$ of 5 ma. at the junction of the low voltage positive resistance region and the negative resistance region. While a larger peak current would permit a lower load impedance across the diode 15, it would increase the difficulty of biasing so that the three intersections $Q_1$, $P_1$ and $P_2$ would occur below the valley region. The source of current 17 is selected so that in its quiescent state, the tunnel diode 15 is forward biased in its low voltage positive resistance region just below the negative resistance region at $Q_1$. The voltage source 21 is selected so that in the quiescent state, the hot carrier diode 20 is forward biased in its high resistance region also at $Q_1$ and so that in its transient state (during the monostable cycle) it is biased in its low resistance region which twice intersects the negative resistance region if the tunnel diode 15 at $P_1$ and $P_2$.

FIG. 3 illustrates the current versus voltage characteristics of diodes biased in accordance with the teachings of the prior art patent to Bergman and provides a comparison with that of the present invention. In its quiescent state, the prior art tunnel diode characteristic TD is shown biased just below the negative resistance region and intersects the tunnel rectifier characteristic TR in its high resistance region at $Q_2$. However, in the transient state, the tunnel rectifier is reversed biased and as a result its characteristic interests the negative resistance region of the tunnel diode only once in its low resistance region $P_3$; the other intersection being in the high resistance region of the rectifier $P_4$. As a result, a significantly higher amplitude signal voltage is required to trigger the monostable circuit as hereinafter explained.

The trigger pulse must be of sufficient amplitude to raise the voltage across the tunnel diode beyond the separatrix in order to produce an excursion beyond the valley voltage of the tunnel diode. Again referring to FIG. 3, a trigger pulse of limited amplitude will raise the voltage across the tunnel diode to point $A_2$. However, because it has not crossed the separatrix into the unstable region, the voltage across the tunnel diode will return to the quiescent point $Q_2$ following the trajectory $T_2$ thus providing an output pulse of limited amplitude. If the size of the inductor across the tunnel diode were increased the trigger pulse would then drive the voltage to $A_3$ (across the separatrix) whereupon it would follow the trajectory $T_3$ back to the quiescent point $Q_2$. However, this would increase the recovery time-constant of the circuit and also the reulting pulse width, by an unacceptable amount. A further understanding of the switching trajectories obtained by varying the load across the tunnel diode can be obtained from an article by William C. G. Ortel entitled "A Monostable Tunnel Diode Trigger Circuit"; Proceedings of the IEEE: volume 54, No. 7, pages 936–946.

Referring again to FIGS. 1 and 2, because of the limited amplitude of trigger pulses, the impedance of the load which is a shunt with the tunnel diode 15 must be maintained high during the initial triggering stages of the monostable cycle. As stated above, this could be readily achieved by utilizing a larger inductor 16. However, in order to have a pulse width of 3 ns. at an operating frequency of 70 mHz., the inductor 16 must have a value of approximately 0.1 $\mu$h. These short pulses widths are required in order to insure that the recovery cycle following one pulse substantially reaches the quiescent point $Q_1$ prior to the commencement of a subsequent pulse. Therefore, in order to achieve the high impedance, the hot carrier diode 20 is forward biased in its low voltage high resistance region just below the knee of its characteristic $Q_1$ when in its quiescent state. This results in a slightly longer recovery time of the output pulse because of the increased time-constant of the load in shunt with the tunnel diode 15. For the circuit 13 to be monostable there must be only one intersection in the positive resistance regions of the tunnel diode 15; the other intersections $P_1$ and $P_2$ with the hot carrier diode characteristic HCD must occur in the negative resistance region of the tunnel diode characteristic TD. In addition, in order to lower the trigger threshold of the circuit, the hot carrier diode characteristic HCD must intersect that of the tunnel diode TD in the former's low resistance region $P_1$ as explained more fully hereinafter with reference to FIG. 4.

As stated above the non-linear load line of the hot carrier diode 20 presents a high impedance during the low voltage triggering phase. However, once triggering has been initiated, the dynamic impedance of the hot carrier diode 20 and hence the load across the tunnel diode 15 rapidly drops so that on completion of the triggering pulse, the voltage across the tunnel diode 15 follows the signal output trajectory $T_1$ rapidly back to the quiescent point $Q_1$.

FIG. 4 illustrates the triggering sensitivity for two biasing arrangements superimposed on the current versus voltage characteristic of a tunnel diode. Utilizing the non-linear biasing arrangement of the present invention, a separatrix which intersects the tunnel diode characteristic TD at $P_1$ is obtained while utilizing the non-linear biasing arrangement of the prior art results in a separatrix that intersects TD at $P_4$. It is evident that a trigger pulse commencing from the quiescent point $Q_3$ would traverse the curve of the present invention at $S_1$ before that of the prior art at $S_2$, thus requiring a smaller trigger amplitude to initiate an output cycle. Thus, it has been discovered that utilizing the non-linear load-line biasing of the present invention results in a movement of the separatrix which enhances the triggering sensitivity of the circuit.

Referring to FIGS. 1 and 2, in operation an F-M carrier signal, which has previously been amplied and limited in the R-F and I-F stages of a receiver (not shown), is connected through the input terminals 10 to the tunnel diode limiter 11 which provides at its output a substantially rectangular wave. The signal is then differentiated by the capacitor 12 in conjunction with the resistor 14 and the dynamic impedance of the tunnel diode 15, so as to produce a train of very short positive going trigger pulses. It is important that the width of the pulses be relatively short with respect to the width of the output pulses produced by the monostable circuit 13 in order not to affect the resultant pulse width and hence the immunity of the monostable switching action from changes in drive.

The trigger pulses raise the voltage across the tunnel diode 15 from the quiescent point $Q_1$ to $A_1$ (FIG. 2) which is above the separatrix. The path $Q_1$–$A_1$ is determined by the shape, duration and magnitude of the trigger pulses impressed across the tunnel diode 15. Thereafter, the voltage across the tunnel diode 15 follows the trajectory $T_1$ back to the quiescent point $Q_1$. This produces a train of positive going output signal pulses, across the output of the monostable circuit 13, of equal amplitude and energy content. It is evident that the repetition rate of the pulses will be proportional to the incoming frequency of the F-M carrier signal across the input terminals 10.

The output signal pulses are coupled to the input of the amplifier 22. After amplification, the output signal from the amplifier 22 is integrated in the linear integrator 23 and appears as a demodulated signal output across the terminals 24. It is evident that the input impedance of the amplifier 22 must not appreciably load the monostable circuit 13. Also, because of the narrow width of the output pulses, storage delays in any transistors used in the amplifier 22 must be minimized. This can be achieved by operating the transistors therein (not shown) above current cut-off and below saturation.

What is claimed is:

1. In a monostable circuit comprising:

a tunnel diode having a negative resistance region interposed low and high voltage positive resistance regions;

an inductance means and a current source serially connected across the tunnel diode;

a hot carrier diode and a voltage source serially connected across the current source, the hot carrier diode having a low voltage high resistance region and a high voltage low resistance region;

impedance means for connecting a signal voltage across the tunnel diode; and means for connecting the resulting signal voltage from the tunnel diode;

the improvement comprising;

said current and voltage sources coacting to forward bias said diodes so that in a quiescent state the low voltage high resistance region of the hot carrier diode intersects the low voltage positive resistance region of the tunnel diode just below the negative resistance region and so that in a transient state the high voltage low resistance region of the hot carrier diode twice intersects the negative resistance region of the tunnel diode.

2. A monostable circuit as defined in claim 1 in which the current and voltage sources are connected in series aiding across the hot carrier diode.

References Cited

UNITED STATES PATENTS

| | | | |
|---|---|---|---|
| 3,146,416 | 8/1964 | Bobon et al. | 329—205(TDX) |
| 3,206,690 | 9/1965 | Watters et al. | 307—322X |
| 3,209,162 | 9/1965 | Bergman | 307—286X |
| 3,344,354 | 9/1967 | Bellem | 325—348 |
| 3,479,526 | 11/1969 | Stanchi | 307—322X |

OTHER REFERENCES

Krakauer et al.: "Hot Carrier Diodes Switch in Picoseconds," July 19, 1963, Electronics, pp. 53–55.

ALFRED L. BRODY, Primary Examiner

U.S. Cl. X.R.

307—286, 301, 322; 317—235; 329—205